US010268690B2

(12) United States Patent
Bostick et al.

(10) Patent No.: US 10,268,690 B2
(45) Date of Patent: Apr. 23, 2019

(54) IDENTIFYING CORRELATED CONTENT ASSOCIATED WITH AN INDIVIDUAL

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/474,313

(22) Filed: Mar. 30, 2017

(65) Prior Publication Data

US 2018/0285359 A1 Oct. 4, 2018

(51) Int. Cl.
*G06F 17/00* (2006.01)
*G06F 17/30* (2006.01)
*G06F 17/27* (2006.01)

(52) U.S. Cl.
CPC .... *G06F 17/30038* (2013.01); *G06F 17/2785* (2013.01); *G06F 17/30017* (2013.01); *G06F 17/2775* (2013.01)

(58) Field of Classification Search
CPC ... G06F 17/279; G06Q 30/02; G06Q 30/0201
USPC .......................................................... 704/9
See application file for complete search history.

(56) References Cited

U.S. PATENT DOCUMENTS

| 9,176,957 | B2 | 11/2015 | Myslinski | |
|---|---|---|---|---|
| 9,471,954 | B2 | 10/2016 | Bostick et al. | |
| 2005/0114161 | A1* | 5/2005 | Garg | G06Q 30/02 703/2 |

(Continued)

OTHER PUBLICATIONS

Kawahara et al., "Identifying Contradictory and Contrastive Relations between Statements to Outline Web Information on a Given Topic", http://anthology.aclweb.org/C/C10/C10-2061.pdf, Coling 2010: Poster Volume, pp. 534-542, Beijing, Aug. 2010, 9 pages.

(Continued)

*Primary Examiner* — Daniel Abebe
(74) *Attorney, Agent, or Firm* — Christopher McLane; Andrew D. Wright; Roberts Mlotkowski Safran Cole & Calderon, P.C.

(57) ABSTRACT

A computer-implemented method includes: receiving, by a computing device, a plurality of content objects from one or more computer content source devices; extracting, by the computing device, metadata from the plurality of content objects; storing, by the computing device, a plurality of records having the extracted metadata in a repository, wherein each record identifies a time in which a statement was made by an individual regarding a topic; identifying, by the computing device, correlated content between the plurality of content objects based on comparing the metadata in the records, wherein the correlated content includes a plurality of statements made by the individual regarding the topic at different periods of time; generating, by the computing device, a correlated content object having the correlated content; and providing, by the computing device, the correlated content object to a user device.

19 Claims, 12 Drawing Sheets

(56) References Cited

U.S. PATENT DOCUMENTS

| | | | |
|---|---|---|---|
| 2009/0048823 A1* | 2/2009 | Liu | G06F 17/2745 |
| | | | 704/9 |
| 2009/0063277 A1 | 3/2009 | Bernosky et al. | |
| 2013/0080208 A1* | 3/2013 | Wang | G06Q 30/01 |
| | | | 705/7.32 |
| 2013/0262462 A1 | 10/2013 | Srikrishna et al. | |
| 2013/0263019 A1* | 10/2013 | Castellanos | G06Q 50/01 |
| | | | 715/753 |
| 2015/0089409 A1* | 3/2015 | Asseily | G06Q 10/10 |
| | | | 715/765 |
| 2015/0142888 A1* | 5/2015 | Browning | H04L 12/1831 |
| | | | 709/204 |
| 2016/0111127 A1 | 4/2016 | Bostick et al. | |
| 2016/0162930 A1* | 6/2016 | Duggal | G06Q 30/0245 |
| | | | 705/14.44 |
| 2017/0092326 A1 | 3/2017 | Bostick et al. | |

OTHER PUBLICATIONS

Nguyen et al., "Recognition of Agreement and Contradiction between Sentences in Support-Sentence Retrieval", http://da.xmachina.gr/Proceedings/KICSS2013/files/papers/paper15.pdf, Proceedings of KICSS'2013, pp. 413-424, Progress & Business Publishers, Kraków, 2013, 12 pages.

Anonymous, "Method and System for Dynamically Assembling Video Segments from Different Videos based on Search Criteria and a Video Template", IP.com, Mar. 16, 2015, 4 pages.

Mell et al., "The NIST Definition of Cloud Computing", NIST, Special Publication 800-145, Sep. 2011, 7 pages.

* cited by examiner

| Speaker | Date | Topic | Content Transcription | Sentiment | Content Object Location |
|---|---|---|---|---|---|
| Jon Smith | 1/25/2016 | Stadium Building | "I am all for the building of the stadium since that will bring more fans out to the games and more kids might want to play for us". | Positive/favorable | http://exampleclip.com Time index 2:06 - 2:20 |
| Jon Smith | 9/22/2015 | Stadium Building | "I do not think a new stadium is a priority. I would first put money in the rebuilding of our Gym to make our kids stronger, and I would also rather put money in building a better coaching staff in regards to recruiting". | Negative/unfavorable | http://exampleclip2.com Time index 5:33 - 5:58 |

FIG. 7

IDENTIFYING CORRELATED CONTENT ASSOCIATED WITH AN INDIVIDUAL

BACKGROUND

The present invention generally relates to identifying correlated content associated with an individual and, more particularly, to identifying correlated content associated with an individual for comparing statements made by the individual at different points in time.

Statements made by public figures (e.g., athletes, coaches, business leaders, etc.) are often broadcast, stored, and/or printed via multiple different content sources (e.g., live television, internet television, electronic video/audio repositories, newspapers, magazines, etc.). Such statements are often heavily scrutinized by the public to determine the public figure's standpoint or view on various topics. Statements made by an individual (e.g., a public figure) regarding a position, view, or standpoint on a topic may change or remain consistent over time.

SUMMARY

In an aspect of the invention, a computer-implemented method includes: receiving, by a computing device, a plurality of content objects from one or more computer content source devices; extracting, by the computing device, metadata from the plurality of content objects; storing, by the computing device, a plurality of records having the extracted metadata in a repository, wherein each record identifies a time in which a statement was made by an individual regarding a topic; identifying, by the computing device, correlated content between the plurality of content objects based on comparing the metadata in the records, wherein the correlated content includes a plurality of statements made by the individual regarding the topic at different periods of time; generating, by the computing device, a correlated content object having the correlated content; and providing, by the computing device, the correlated content object to a user device.

In an aspect of the invention, there is a computer program product for comparing statements made by an individual regarding a topic at different points in time the computer program product comprising a computer readable storage medium having program instructions embodied therewith. The program instructions are executable by a computing device to cause the computing device to: receive a plurality of content objects from one or more computer content source devices; extract metadata from the plurality of content objects; store a plurality of records having the extracted metadata in a repository, wherein each record identifies a time in which a statement was made by an individual regarding a topic; receive real-time content; extract metadata from the real-time content; identify correlated content based on comparing the metadata in the records with the extracted metadata from the real-time content, wherein the correlated content includes a statement made by the individual regarding the topic at a prior time; generate a correlated content object having the correlated content; and provide the correlated content object to a user device.

In an aspect of the invention, a system includes: a CPU, a computer readable memory and a computer readable storage medium associated with a computing device; program instructions to receive a plurality of content objects from one or more computer content source devices; program instructions to extract metadata from the plurality of content objects; program instructions to store a plurality of records having the extracted metadata in a repository, wherein each record identifies a time in which a statement was made by an individual regarding a topic; program instructions to receive content correlating criteria; program instructions to identify correlated content based on comparing the metadata in the records with the content correlating criteria, wherein the correlated content includes a plurality of statements made by the individual regarding the topic at different points in time; program instructions to generate a correlated content object having the correlated content; and program instructions to provide the correlated content object to a user device. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 7 shows an example data structure of extracted metadata for content objects in accordance with aspects of the present invention.

DETAILED DESCRIPTION

Figure 1:
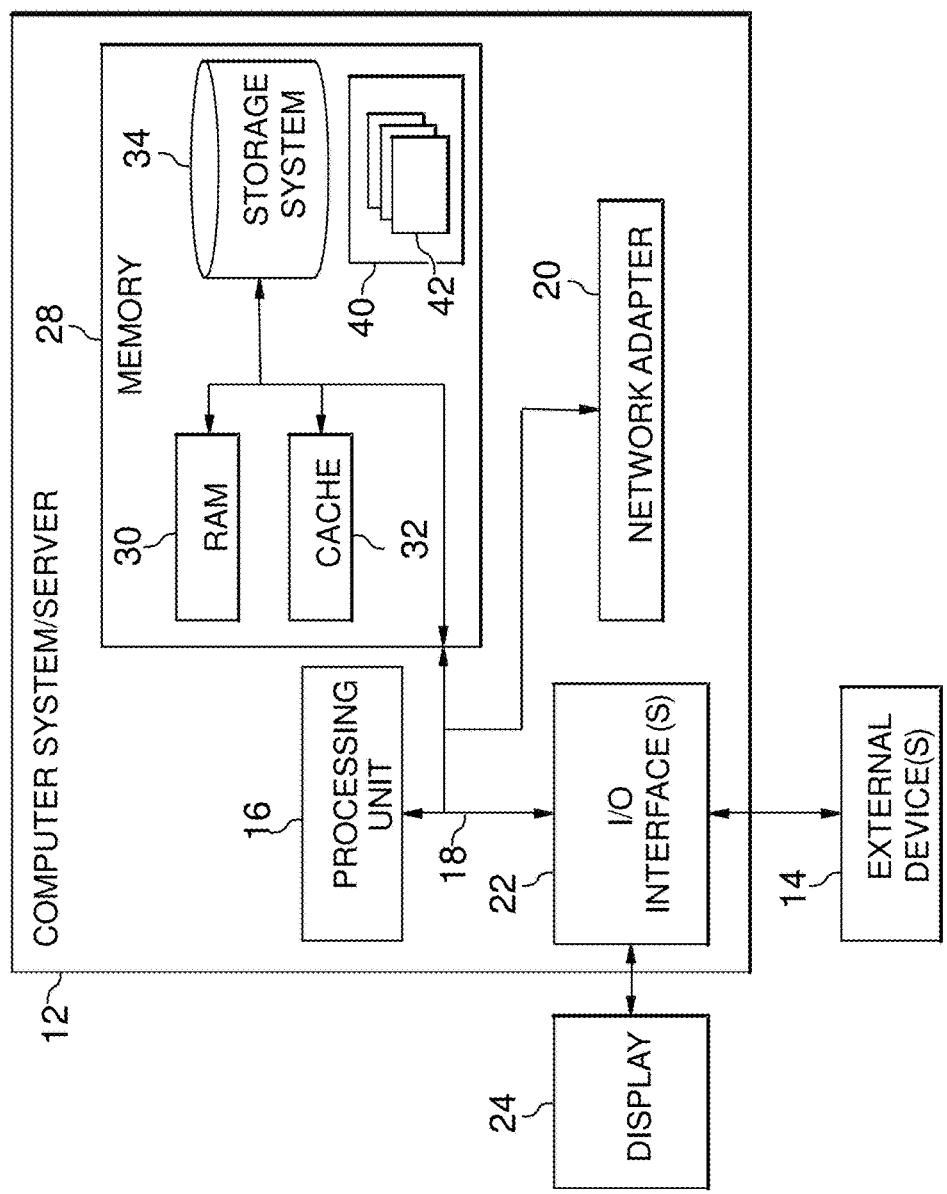
FIG. 1 depicts a cloud computing node according to an embodiment of the present invention.

The present invention generally relates to identifying correlated content associated with an individual and, more particularly, to identifying correlated content associated with an individual for comparing statements made by the individual at different points in time. Evaluating an individual's credibility and/or position on a topic may require evaluating the individual's statements on the topic over a period of time to determine whether the individual's position changed over time, and to what degree. Accordingly, aspects of the present invention may collect content from various sources over a period of time in which the collected content includes an individual's statements regarding a topic over a period of time. Further, aspects of the present invention may present correlated content regarding statements made by the individual regarding a particular topic in the form of a collage or other form in which the statements made by the individual over a period of time can be easily compared. In embodiments, aspects of the present invention may generate a credibility or consistency score regarding an individual's consistency of statements regarding a particular topic.

As described in greater detail herein, aspects of the present invention may extract metadata from content objects obtained from various content sources, and may store the metadata in a structured manner. For example, aspects of the present invention may extract metadata from a content object (e.g., a video) that identifies an individual that is speaking in the video, a date/time, a transcription of what was spoken, a topic, the individual's position/sentiment regarding the topic, and a link to the content object. Over a period of time, additional content objects are obtained from various content sources and metadata is extracted from the content objects and stored in a repository. Using the metadata in the repository, aspects of the present invention may identify statements made by an individual regarding a topic over a period of time. Further, aspects of the present invention may generate a correlated content object that may include, for example, a collage or other type of comparison of statements made by the individual regarding the particular topic over a period of time. In this way, the individual's statements may be compared to determine whether the individual's position/sentiment regarding the topic changed over time, and to what degree.

As described herein, aspects of the present invention may collect publically available video, audio, text, and/or other types of content from multiple content sources (e.g., television broadcast feeds, internet videos, printed/electronically published articles, social media posts, etc.). For certain individuals (e.g., public figures), the sheer volume of content that is published may be from hundreds to thousands of videos, articles, etc. per year. Further, the number of topic discussed and the number of statements made by an individual that are published may be vast. Thus, it is urged that processes of embodiments of the present invention (e.g., the collecting, and extracting of metadata regarding statements made by an individual on different topics) require the use of computing technology and cannot be done simply with pen and paper. Further, aspects of the present invention improve the functioning of computer technology itself by improving the efficiency in which data is collected, processed, and presented. As such, aspects of the present invention curb and reduce computer resource consumption and thus, improve the functioning of computer technology itself.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
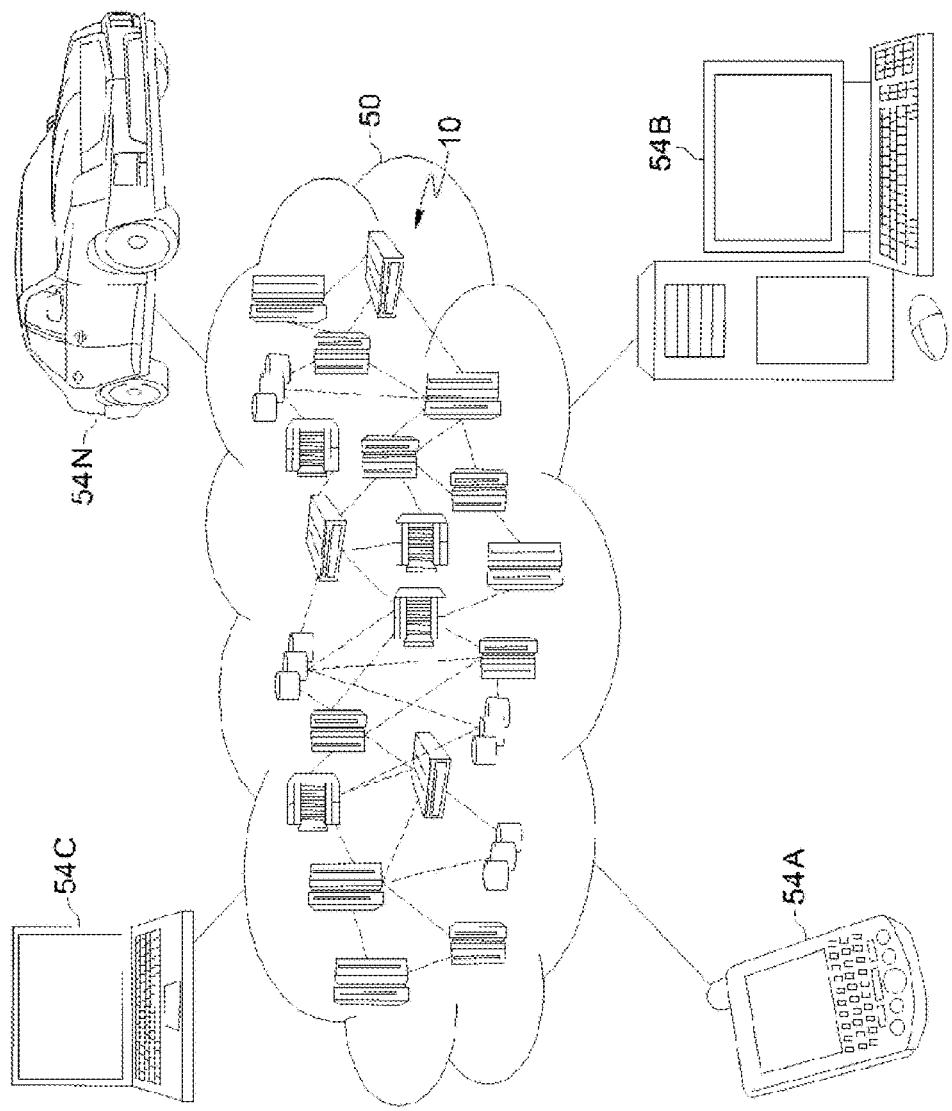
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
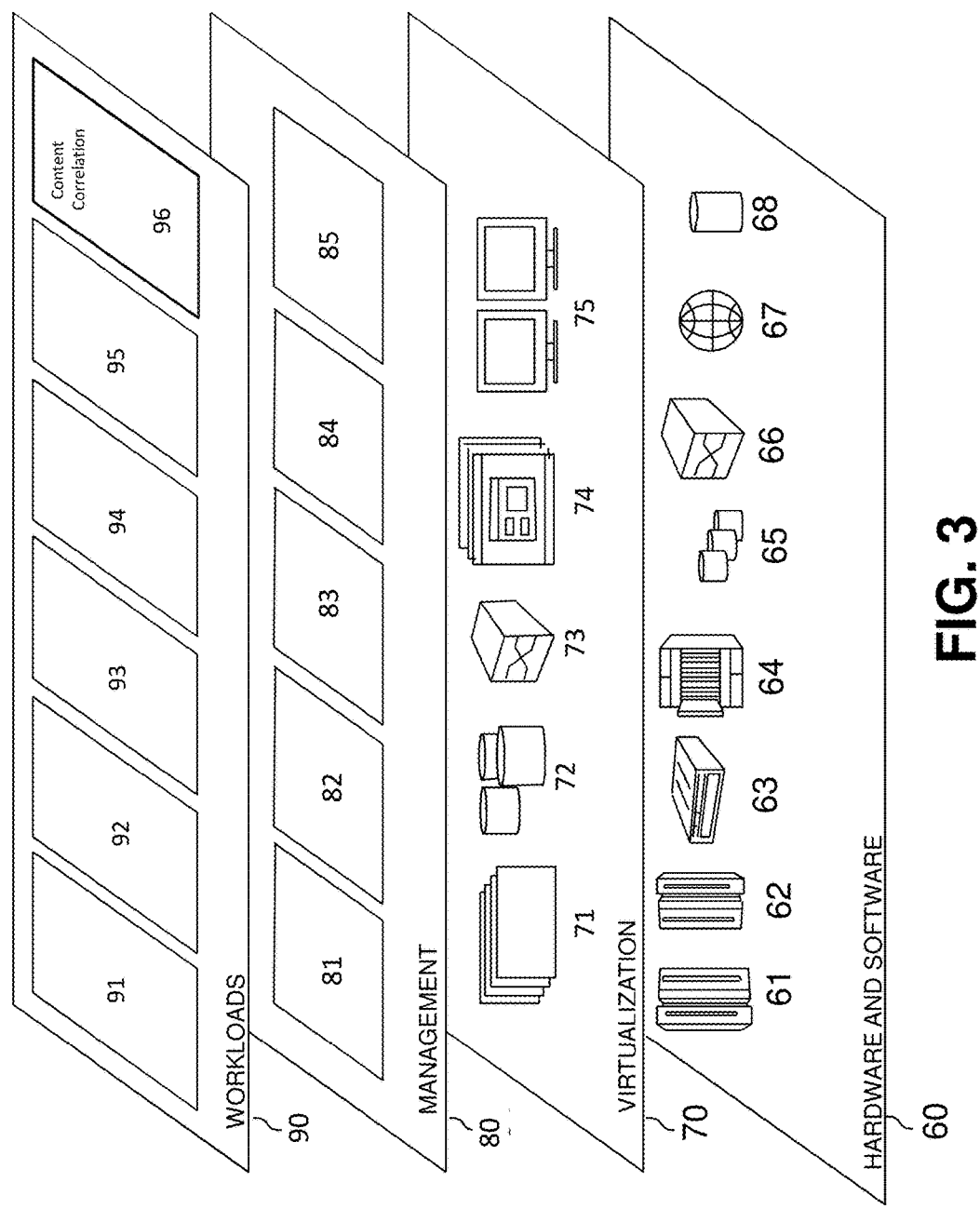
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content correlation 96.

Referring back to FIG. 1, the program/utility 40 may include one or more program modules 42 that generally carry out the functions and/or methodologies of embodiments of the invention as described herein (e.g., such as the functionality provided by content correlation 96). Specifically, the program modules 42 may receive content objects across multiple content sources, extract metadata from the content objects, and store the extracted metadata in individual records with each record identifying an individual, a topic, statements made about the topic, sentiment/position on the topic, date/time in which the statement was made, and/or a link to the content object. The program modules 42 may also compare stored extracted metadata with metadata associated with live content and/or associated with user-defined criteria, create a correlated content object having content objects that are correlated with the live content and/or with user-defined criteria (e.g., content objects having statements regarding a topic made by the individual), and output the correlated content object to display comparison between statements made by the individual regarding a topic over a period of time. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a content correlation server as shown in FIG. 4.

Figure 4:
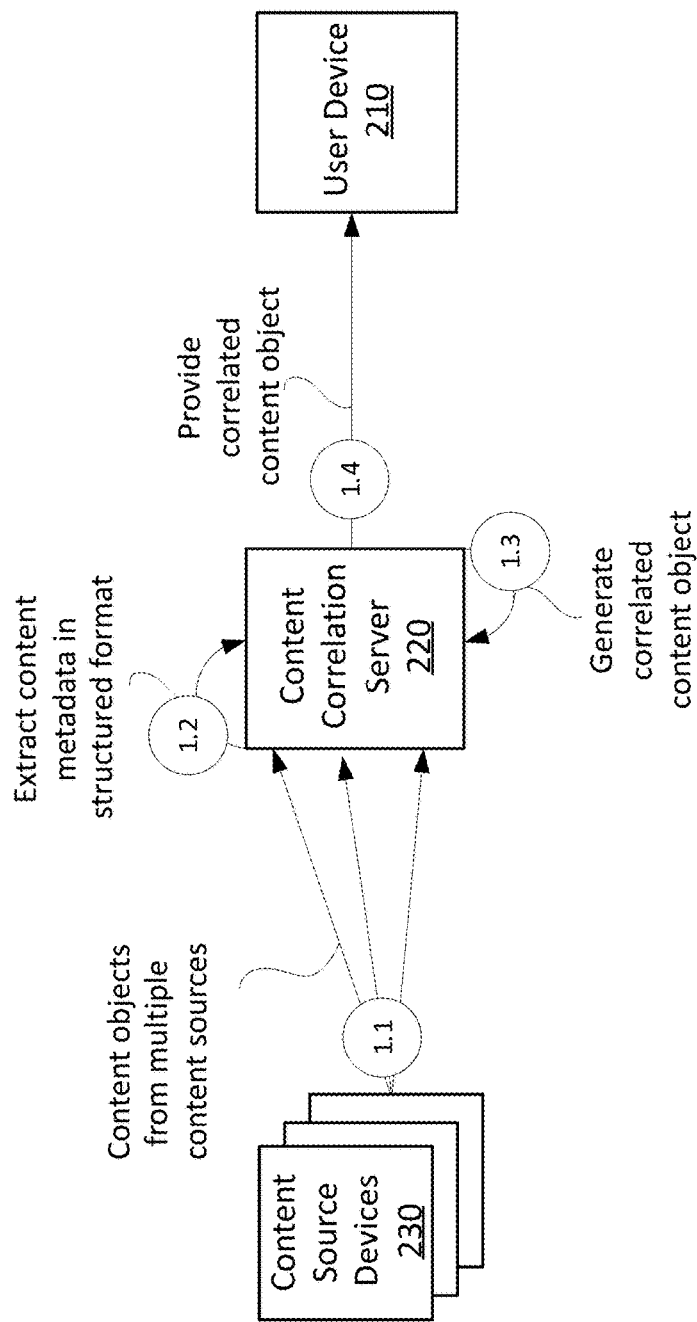
FIG. 4 shows an overview of an example implementation in accordance with aspects of the present invention

FIG. 4 shows an overview of an example implementation in accordance with aspects of the present invention. As shown in FIG. 4, a content correlation server 220 may receive content objects associated with an individual from multiple content source devices 230 (step 1.1). For example, the content correlation server 220 may receive content objects, such as video (e.g., from live-broadcasted television, pre-recorded videos, etc.), text from published articles, content from social media platforms, etc. As described herein, the content objects may relate to statements made by individuals regarding various topics.

At step 1.2, the content correlation server 220 may extract metadata associated with the content objects in a structured format. For example, the content correlation server 220 may extract metadata associated with the content object, such as an individual that was speaking, a transcript of what was spoken by the individual, a topic, the individual's position/sentiment on the topic, a link to where the content object may be accessed or obtained, etc.

As described herein, metadata may be included as part of the content object. For example, certain content objects (e.g., video files, text files, etc.) may include a header that contains metadata, or may be accompanied by a file that contains metadata. Additionally, or alternatively, metadata may be obtained via image/speech recognition techniques (e.g., to identify an individual whose speech, image, and/or video is included in the content object). Additionally, or alternatively, the metadata may be obtained via speech to text techniques (e.g., to create a transcription of words spoken by the individual). Additionally, or alternatively, the metadata may be obtained via natural language processing techniques (e.g., to determine a topic and/or individual's position regarding the topic).

In embodiments, the content correlation server 220 may store the metadata in a structured format in which the metadata is stored in individual records. As described herein, each record may identify the date/time of the content object, an individual whose speech, image, and/or video is included in the content object, a transcription of statements made by the individual, a topic associated with the statements, the individual's position and/or sentiment regarding the topic, a link where the object may be accessed, and/or a time-index relating to a portion of the content object (e.g., a portion of a video or audio track) in which the statements were made. In embodiments, separate records may be generated for the statements made by the same individual regarding different topics. For example, for a content object (e.g., a video of a press-conference), different metadata records may be stored for different topics discussed by the individual (e.g., to more easily compare statements made by the individual regarding specific topics).

At step 1.3, the content correlation server 220 may generate a correlated content object. For example, the content correlation server 220 may generate a correlated content object that may include a collage and/or other representation of statements made by an individual regarding a topic over a period of time. In embodiments, the a correlated content object may be generated in real-time in which real-time or live statements being made by the individual regarding a topic may be compared to prior statements made by the individual regarding the topic. As described herein, real-time or live content may be analyzed to identify the individual, identify statements being made by the individual, identify the topic being discussed, and look up, from stored metadata records prior records and content objects having instances in which the same individual previously made statements about the same topic. As an illustrative non-limiting example, the content correlation server 220 may identify that an individual (e.g., a coach of a sports team) is currently discussing the construction of a new stadium. The content correlation server 220 may identify, from stored metadata records, content objects in which the individual previously made statements about the construction of a new stadium. The content correlation server 220 may generate a correlated content object having those content objects in which the individual previously made statements about the construction of a new stadium (e.g., in the form of a video/still image collage, a comparison table, etc.).

In embodiments, the content correlation server 220 may generate a correlated content object based on user-defined criteria. For example, a user may define which individual, topic, and date range with which to create a correlated content object that identifies content objects having statements made by the individual regarding the topic over a period of time. In embodiments, correlated content object may identify a consistency between current statements and prior statements made by the individual (e.g., by comparing a current position and a prior position on the topic).

At step 1.4, the content correlation server 220 may provide the correlated content object to the user device 210. In embodiments, the user device 210 may display the correlated content object. In one example, the user device 210 may overlay the correlated content object over a live broadcast to allow the user to quickly identify similarities and/or discrepancies between prior statements and current statements made by the individual. Additionally, or alternatively, the content object may be played back by the user at a later time and may be stored in the form of a video file and/or other type of computer file.

Figure 5:
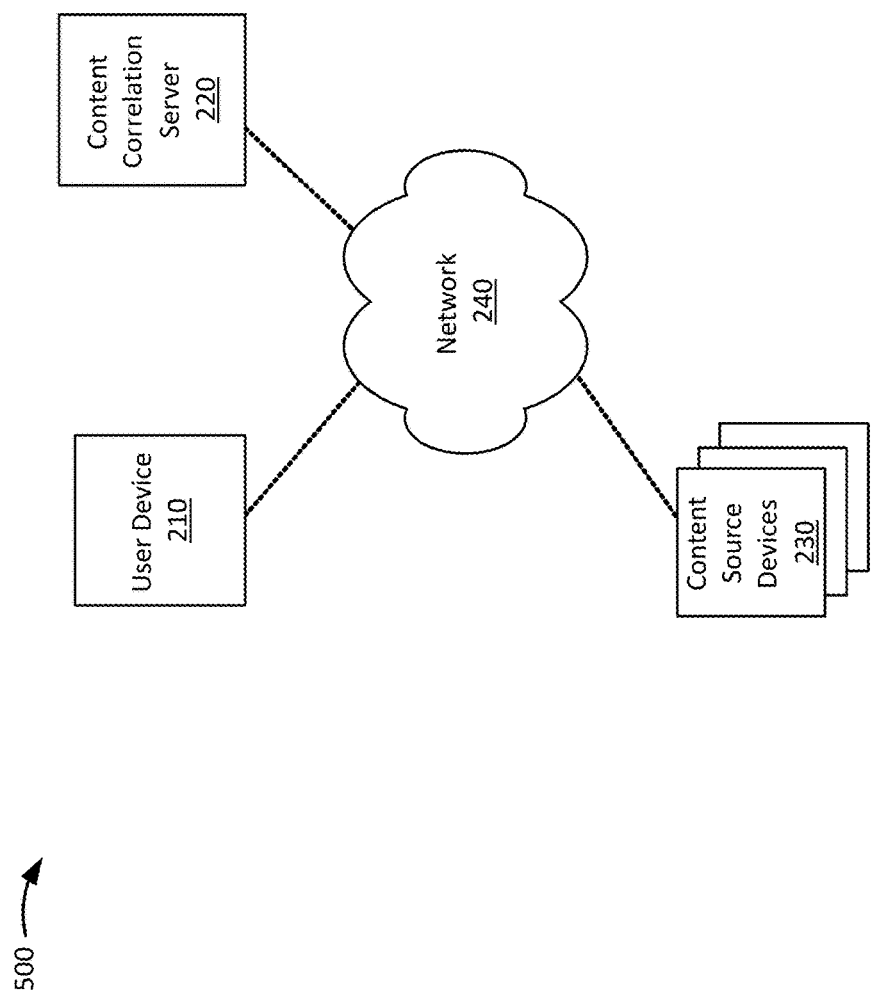
FIG. 5 shows an example environment in accordance with aspects of the present invention.

FIG. 5 shows an example environment in accordance with aspects of the present invention. As shown in FIG, 5, environment 500 may include a user device 210, a content correlation server 220, content source devices 230, and network 240. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a device capable of communicating via a network, such as the network 240. For example, the user device 210 may correspond to a mobile communication device (e.g., a smart phone or a personal digital assistant (PDA)), a portable computer device (e.g., a laptop or a tablet computer), or another type of device. In some embodiments, the user device 210 may be used to provide criteria for generating a correlated content object. For example, the user device 210 may provide criteria for generating a correlated content object including content objects having statements made by a particular individual regarding a particular topic over a period of time. The user device 210 may receive and display content objects in order for a user to easily compare statements made by the individual over a period of time.

The content correlation server 220 may include one or more computing devices (e.g., such as computer system/server 12 of FIG. 1) that receives content objects from the content source devices 230, extracts metadata from the content objects, stores the metadata in individual records, identifies correlated content objects based on the stored metadata, and generates a correlated content object. The content correlation server 220 may generate a correlated content object based on criteria received from the user device 210 and/or based on the metadata of live-broadcasted content.

The content source devices 230 may include one or more computing devices (e.g., such as computer system/server 12 of FIG. 1) that stores and provides content objects to the content correlation server 220. For example, the content source devices 230 may include sources associated with social media platform, news platforms, television broadcasting systems, or the like. The content source devices 230 may store electronic content objects consumable only by computing devices, such as the content correlation server 220, user device 210, and/or other electronic computing devices.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
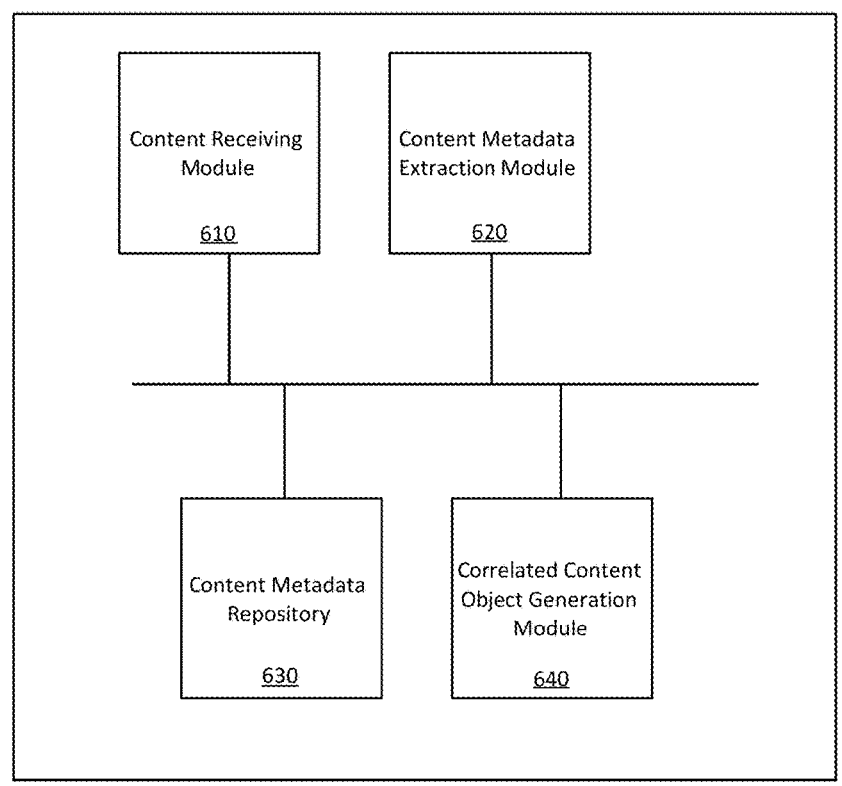
FIG. 6 shows a block diagram of example components of a content correlation server in accordance with aspects of the present invention.

FIG. 6 shows a block diagram of example components of a content correlation server in accordance with aspects of the present invention. As shown in FIG. 6, the content correlation server 220 may include a content receiving module 610, a content metadata extraction module 620, a content metadata repository 630, and a correlated content object generation module 640. In embodiments, the content correlation server 220 may include additional or fewer components than those shown in FIG. 6. In embodiments, separate components may be integrated into a single computing component or module. Additionally, or alternatively, a single component may be implemented as multiple computing components or modules.

The content receiving module 610 may include a program module (e.g., program module 42 of FIG. 1) that receives content from one or more content source devices 230. For example, the content receiving module 610 may periodically request content and/or receive content as part of a content receiving service. In embodiments, the content receiving module 610 may receive a variety of content, including but not limited to live broadcast content, pre-recorded content, video content, audio content, text content, etc.

The content metadata extraction module 620 may include a program module (e.g., program module 42 of FIG. 1) that extracts metadata from the content received by the content receiving module 610. For example, the content metadata extraction module 620 may extract metadata, such as information identifying an individual that is speaking in the video, a date/time, a transcription of what was spoken, a topic, the individual's position/sentiment regarding the topic, and a link to the content object. In embodiments, the content metadata extraction module 620 may extract metadata when certain content objects (e.g., video files, text files, etc.) include predefined metadata (e.g., in a header of the content object), or when the content object is accompanied by a file that contains metadata. Additionally, or alternatively, the content metadata extraction module 620 may obtain metadata via image/speech recognition techniques (e.g., to identify an individual whose speech, image, and/or video is included in the content object). Additionally, or alternatively, the content metadata extraction module 620 may obtain metadata via speech to text techniques (e.g., to create a transcription of words spoken by the individual). Additionally, or alternatively, the content metadata extraction module 620 may obtain metadata via natural language processing techniques (e.g., to determine a topic and/or individual's position regarding the topic).

The content metadata repository 630 may include a data storage device (e.g., storage system 34 of FIG. 1) that stores the metadata in a structured format. For example, the content metadata repository 630 may store metadata within individual records in which each record may identify the date/time of a content object, an individual whose speech, image, and/or video is included in the content object, a transcription of statements made by the individual, a topic associated with the statements, the individual's position and/or sentiment regarding the topic, a link where the object may be accessed, and/or a time-index relating to a portion of the content object (e.g., a portion of a video or audio track) in which the statements were made. Over a period of time, as additional content is received by the content receiving module 610 and as metadata for the content is extracted by the content metadata extraction module 620, the content metadata repository 630 may continue to store additional records as described above. In this way, a profile of an individual having the individual's statements regarding various topics may continue to build and grow for a more comprehensive analysis and comparison of the individual's statements over a period of time.

The correlated content object generation module 640 may include a program module (e.g., program module 42 of FIG. 1) that may generate a correlated content object. For example, the correlated content object generation module 640 may generate a correlated content object that may include a collage of videos, images, text, stitched video, comparison table of text, and/or other representation of statements made by an individual regarding a topic over a period of time. In embodiments, the correlated content object may be generated in real-time in which real-time or live statements being made by the individual regarding a topic may be compared to prior statements made by the individual regarding the topic. As described herein, real-time or live content may be analyzed to identify the individual, identify statements being made by the individual, identify the topic being discussed, and look up, from stored metadata records prior records and content objects having instances in which the same individual previously made statements about the same topic.

In embodiments, the correlated content object generation module 640 may generate a correlated content based on user-defined criteria. For example, a user may define which individual, topic, and date range with which to create a correlated content object that identifies content objects having statements made by the individual regarding the topic over a period of time. In embodiments, the correlated content object may identify a measure of consistency between current statements and prior statements made by the individual (e.g., by comparing a current position and a prior position on the topic). For example, in a situation in which when contradictory statements are made, the correlated content object may include a message to emphasize the contradictory statement. Alternatively, when consistent statements are made, the correlated content object may include a message to emphasize the consistent statement. In embodiments, the correlated content object generation module 640 may provide the correlated content object for display on a user device 210.

FIG. 7 shows an example data structure of extracted metadata for content objects in accordance with aspects of the present invention. As shown in FIG. 7, data structure 700 may store data records having metadata for content objects. In the example shown, each record may identify a speaker (e.g., name of an individual) present in the content object, a date of the content object, a topic discussed, a transcription of statements made by the individual, a sentiment, and a location of the content object. As described herein, the location of the content object may identify a URL/link where the content object may be accessed. Also, the location of the content object may identify a time index associated with the speaker and the topic discussed.

As described herein, data structure 700 may store separate records for the same content object when the same content object includes different speakers and discussions of different topics. For example, for a single video file, different speakers and/or topics may be included in the video file. However, metadata for different portions of the content file (e.g., time periods of the video) may include different speakers and/or discussion of different topics. Accordingly, the data structure 700 may store different records for a single content object in which each record identifies the time index associated with a particular speaker/individual discussing a particular topic.

In the examples of FIG. 7, the data structure 700 may store two records associated with a particular individual (e.g., Jon Smith) regarding statements made about a particular topic (e.g., Stadium Building). As shown in FIG. 7, the two records may identify contradictory statements made by the individual at two different points in time (e.g., based on contradictory sentiments). As described herein, the information stored by the data structure 700 may be used to generate a correlated content object in which content from a particular individual regarding a particular topic may be presented in a collage, stitched video, and/or other format.

Figure 8:
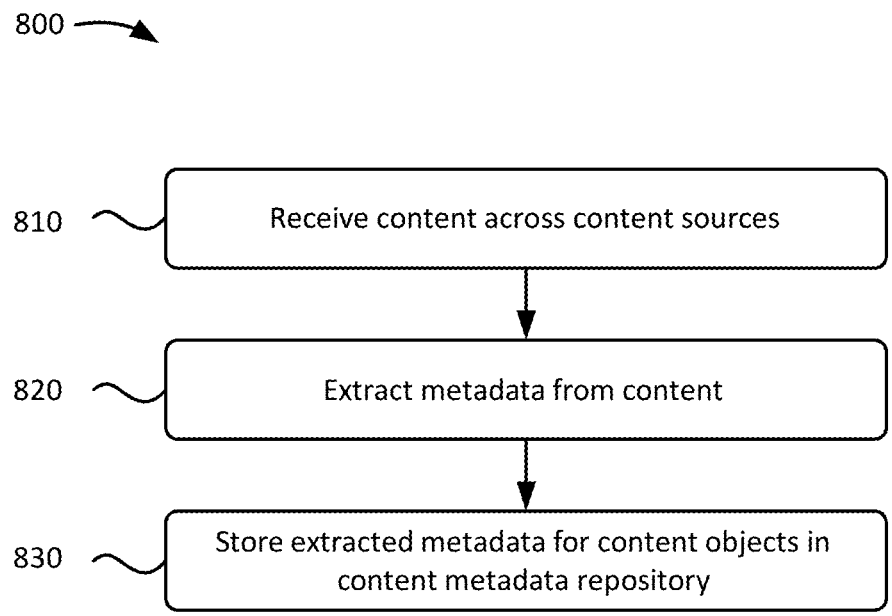
FIG. 8 shows an example flowchart of a process for storing extracted metadata for building a data structure that stores statements made by individuals over a period of time in accordance with aspects of the present invention.

FIG. 8 shows an example flowchart of a process for storing extracted metadata for building a data structure that stores statements made by individuals over a period of time in accordance with aspects of the present invention. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 8, process 800 may include receiving content across content sources (step 810). For example, as described above with respect to the, the content correlation server 220 may periodically request content and/or receive content as part of a content receiving service. In embodiments, the content correlation server 220 may receive a variety of content, including live broadcast content, pre-recorded content, video content, audio content, text content, etc.

Process 800 may also include extracting metadata from the content (step 820). For example, as described above with respect to the content metadata extraction module 620, the content correlation server 220 may extract metadata from the content received by the content receiving module 610. For example, the content correlation server 220 may extract metadata, such as information identifying an individual that is speaking in the video, a date/time, a transcription of what was spoken, a topic, the individual's position/sentiment regarding the topic, and a link to the content object. Additional details regarding the extraction of the metadata are described below with respect to FIG. 9.

Process 800 may further include storing extract metadata for content objects in a content metadata repository (step 830). For example, as described above with respect to the content metadata repository 630, the content correlation server 220 may store the metadata in a structured format. For example, the content correlation server 220 may store metadata within individual records in which each record may identify the date/time of a content object, an individual whose speech, image, and/or video is included in the content object, a transcription of statements made by the individual, a topic associated with the statements, the individual's position and/or sentiment regarding the topic, a link where the object may be accessed, and/or a time-index relating to a portion of the content object (e.g., a portion of a video or audio track) in which the statements were made.

Figure 9:
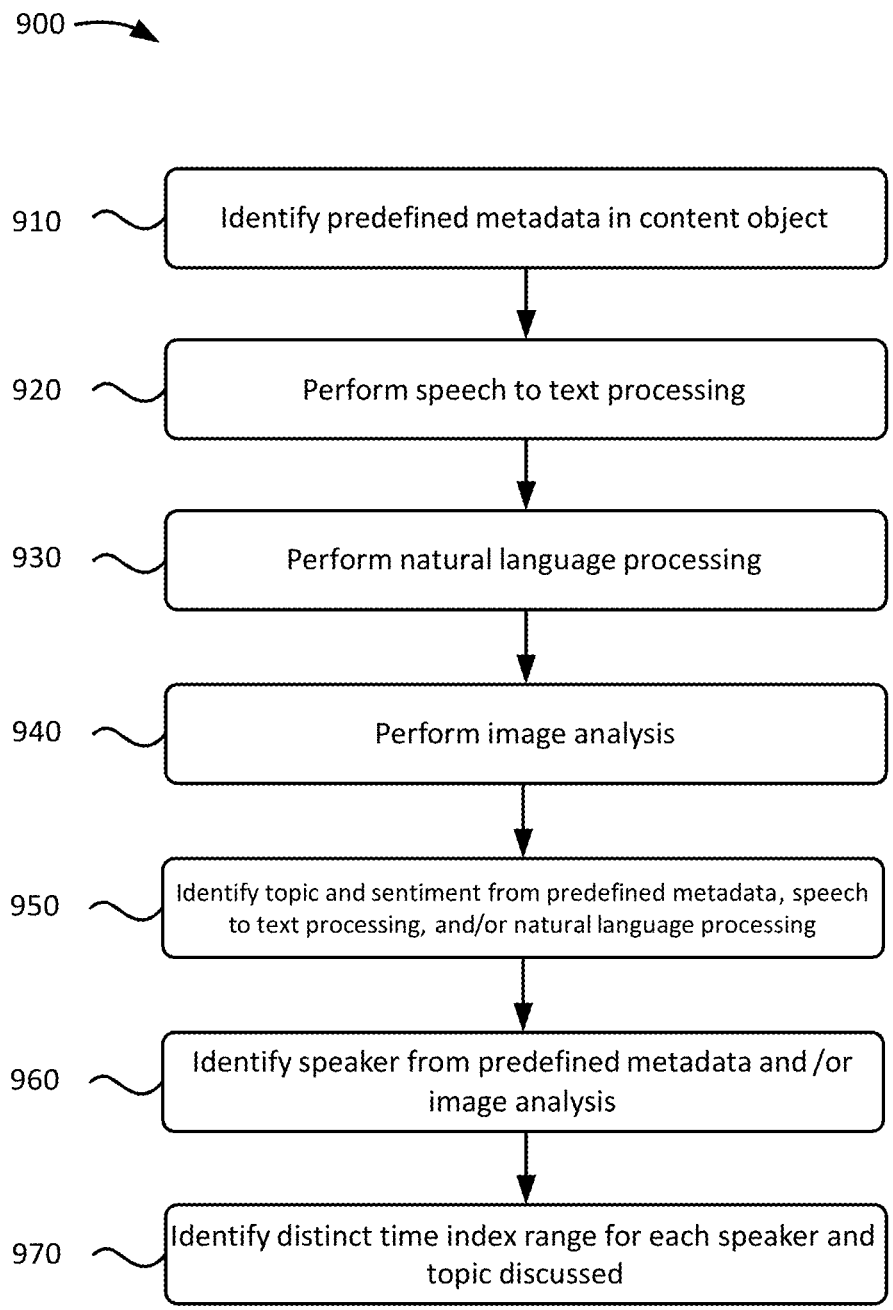
FIG. 9 shows an example process for extracting metadata for content objects in accordance with aspects of the present invention.

FIG. 9 shows an example process for extracting metadata for content objects in accordance with aspects of the present invention. The steps of FIG. 9 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention. In embodiments, process 900 of FIG. 9 may correspond to process step 820 in process 800 of FIG. 8.

As shown in FIG. 9, process 900 may include identifying predefined metadata in a content object (step 910). For example, as described above with respect to the content metadata extraction module 620, the content correlation server 220 may identify predefined metadata included in the content object included in a header of the content object or in a file accompanied by the content object. As described herein, the predefined metadata may include any or all of the metadata that is stored by the content metadata repository 630 of the content correlation server 220. For example, the predefined metadata may include one or more of: information identifying an individual that is speaking in the video, a date/time, a transcription of what was spoken, a topic, the individual's position/sentiment regarding the topic, and a link to the content object.

In practice, however, predefined metadata may not exist or may not identify all of the metadata that is to be stored. Accordingly, process 900 may include additional process steps for extracting metadata that may not be predefined. For example, process 900 may further include performing speech to text processing (step 920). In embodiments, the content correlation server 220 may perform speech to text processing to convert audio from the content object into a transcription of statements.

Process 900 may also include performing natural language processing (step 930). For example, as described above with respect to the content metadata extraction module 620, the content correlation server 220 may perform natural language processing to identify a topic discussed from the text transcription. If the content object is a text or article, the content correlation server 220 may perform natural language processing on the text included in the content object.

Process 900 may further include performing image analysis (step 940). For example, as described above with respect to the content metadata extraction module 620, the content correlation server 220 may perform image analysis and/or facial recognition to identify an individual included in the content object.

Process 900 may also include identifying a topic and sentiment from the predefined metadata, speech to text processing, and/or natural language processing (step 950). For example, the content correlation server 220 may identify the topic and sentiment from the predefined metadata. If the topic is not identified in the predefined metadata, the content correlation server 220 may identify the topic from the speech to text processing and/or the natural language processing.

Process 900 may further include identifying a speaker from the predefined metadata and/or the image analysis (step 960). For example, the content correlation server 220 may identify the speaker from the predefined metadata. Additionally, or alternatively, the content correlation server 220 may identify the speaker from the image analysis if the speaker is not identified from the predefined metadata.

Process 900 may also include identifying a distinct time index range for each speaker and topic discussed (step 970). For example, based on performing natural language processing, the content correlation server 220 may identify portions of the transcription in which a particular topic was discussed. The content correlation server 220 may also identify a time index range corresponding to the topic (e.g., a time index range for a video). In embodiments, the content correlation server 220 may store the metadata, as obtained by using process 900, in individual records as described herein.

Figure 10:
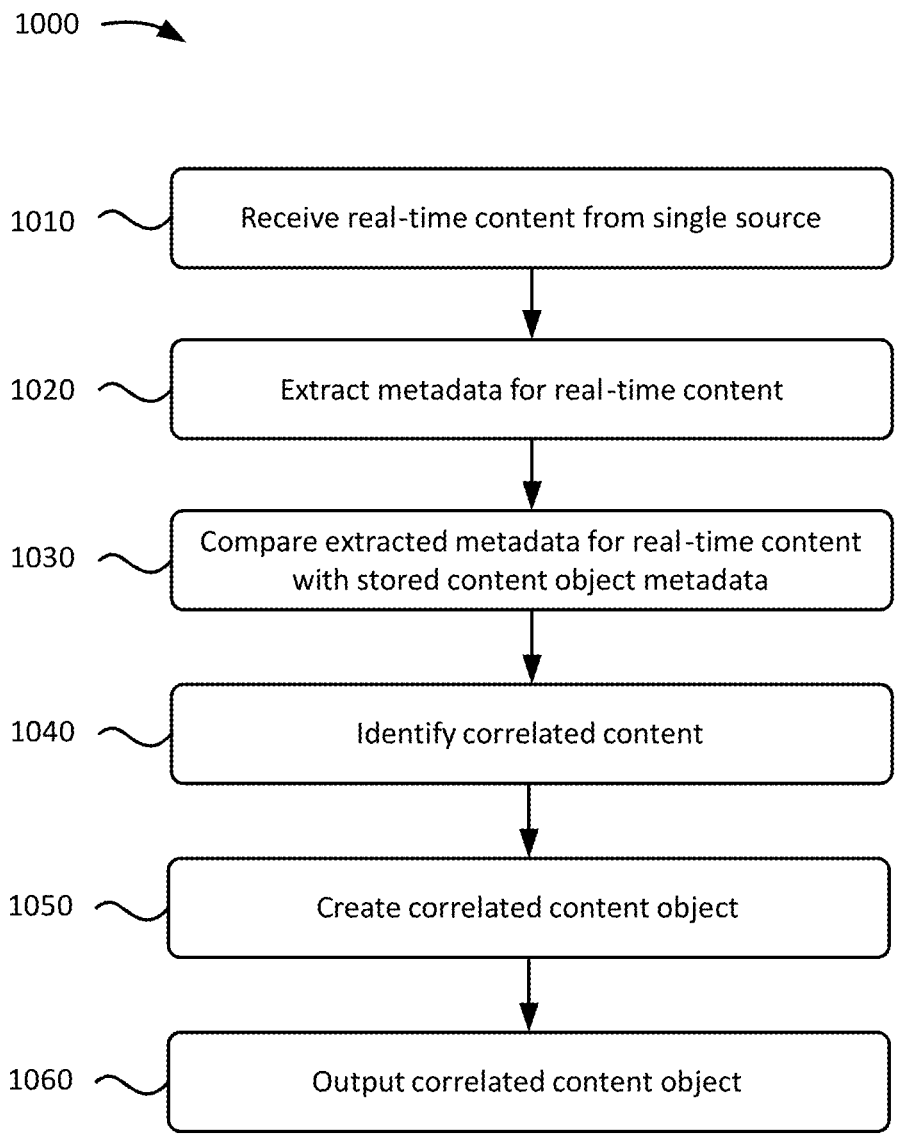
FIG. 10 shows an example process for generating a correlated content object in real-time in accordance with aspects of the present invention.

FIG. 10 shows an example process for generating a correlated content object in real-time in accordance with aspects of the present invention. The steps of FIG. 10 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 10, process 1000 may include receiving real-time content from a single source (step 1010). For example, the content correlation server 220 may receive real-time content from a single source, such as a single video file, broadcast, etc. As described herein, the content correlation server 220 may generate a correlated content object based on statements made by the individual in real-time as presented in the single source.

Process 1000 may further include extracting metadata for the real-time content (step 1020). For example, the content correlation server 220 may extract metadata for the real-time content in a similar manner as is discussed with respect to the content metadata extraction module 620 and process 900.

Process 1000 may also include comparing the extracted metadata for the real-time content with stored content object metadata (step 1030). For example, the content correlation server 220 may compare the extracted metadata for the real-time content (e.g., a speaker and a topic of discussion) with stored content object metadata (e.g., records stored by the content metadata repository 630).

Process 1000 may further include identifying correlated content (step 1040). For example, the content correlation server 220 may identify correlated content based on the comparing. In particular, the content correlation server 220 may identify correlated content that match the same speaker and topic as that of the real-time content. As a specific, non-limiting example, assume that the real-time content includes the speaker Jon Smith discussing the topic of stadium building (e.g., as determined based on extracting the metadata for the real-time content at process step 1020). Accordingly, the content correlation server 220 may identify correlated content having metadata records identifying the same speaker and the same topic. The content correlation server 220 may also identify the location of the correlated content.

Process 1000 may include creating a correlated content object (step 1050). For example, the content correlation server 220 may create a correlated content object by obtaining the correlated content from the location identified in the records of the correlated content. Further, the content correlation server 220 may create the correlated content in the form of a collage of videos, images, text, stitched video, comparison table of text, and/or other representation of statements made by an individual regarding a topic over a period of time. As described herein, the correlated content object may include a visual indicator to highlight or emphasize consistencies or inconsistencies in the statements.

Process 1000 may also include outputting the correlated content object (step 1060). For example, the content correlation server 220 may output the correlated content object to a user device 210 (e.g., a user device 210 that is registered and/or has requested to receive correlated content objects for real-time content).

Figure 11:
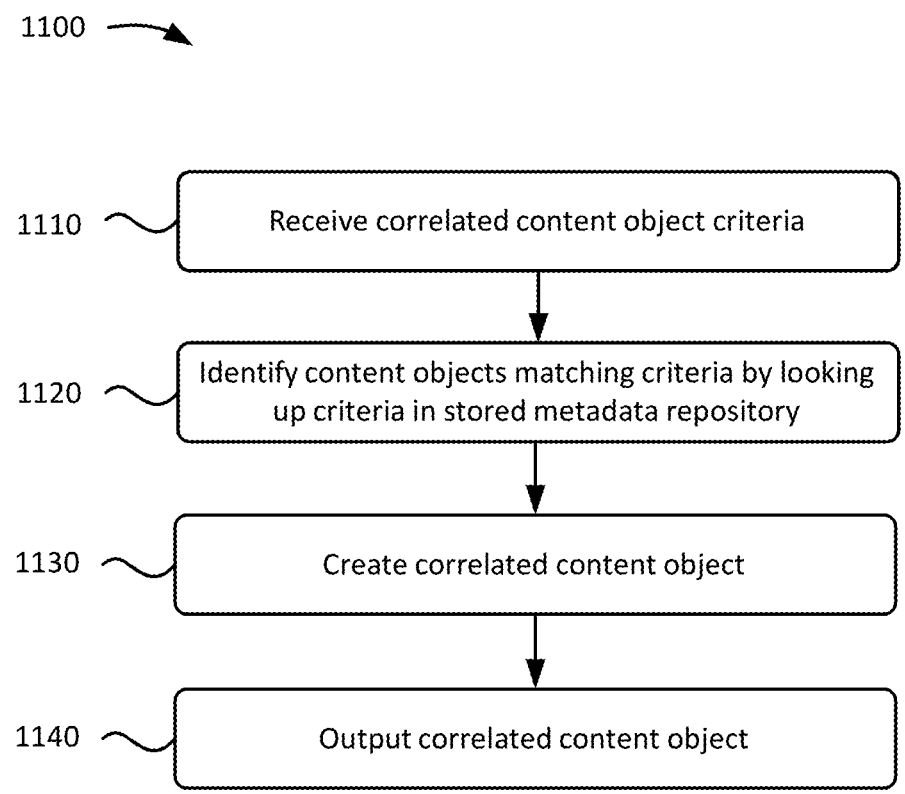
FIG. 11 shows an example process for generating a correlated content object based on receiving criteria from a user in accordance with aspects of the present invention.

FIG. 11 shows an example process for generating a correlated content object based on receiving criteria from a user in accordance with aspects of the present invention. The steps of FIG. 11 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

Process 1100 may include receiving correlated content object criteria (step 1110). For example, the content correlation server 220 may receive correlated content object criteria from a user device 210. In embodiments, the correlated content object criteria may identify a speaker, a time period, and/or a topic. A user may select the correlated content object criteria for comparing statements made by the speaker regarding a topic over a period of time. In embodiments, the correlated content object criteria may also identify whether to identify only consistent statements, inconsistent statements, or all statements.

Process 1100 may further include identifying content objects matching the criteria by looking up the criteria in a stored metadata repository (step 1120). For example, the content correlation server 220 may look up the criteria in the content metadata repository 630 to identify records that match the criteria (e.g., records associated with the speaker, topic, and date range stipulated by the criteria).

Process 1100 may further include creating a correlated content object (step 1130). For example, the content correlation server 220 may create the correlated content object based on the identified content objects matching the criteria. In embodiments, the content correlation server 220 may create the correlated content object as described above with respect to the correlated content object generation module 640 and process step 1050. Process 1100 may also include outputting the correlated content object (step 1140). For example, the content correlation server 220 may output the correlated content object (e.g., in a similar manner as described above with respect to the correlated content object generation module 640 and process step 1060).

Figure 12:
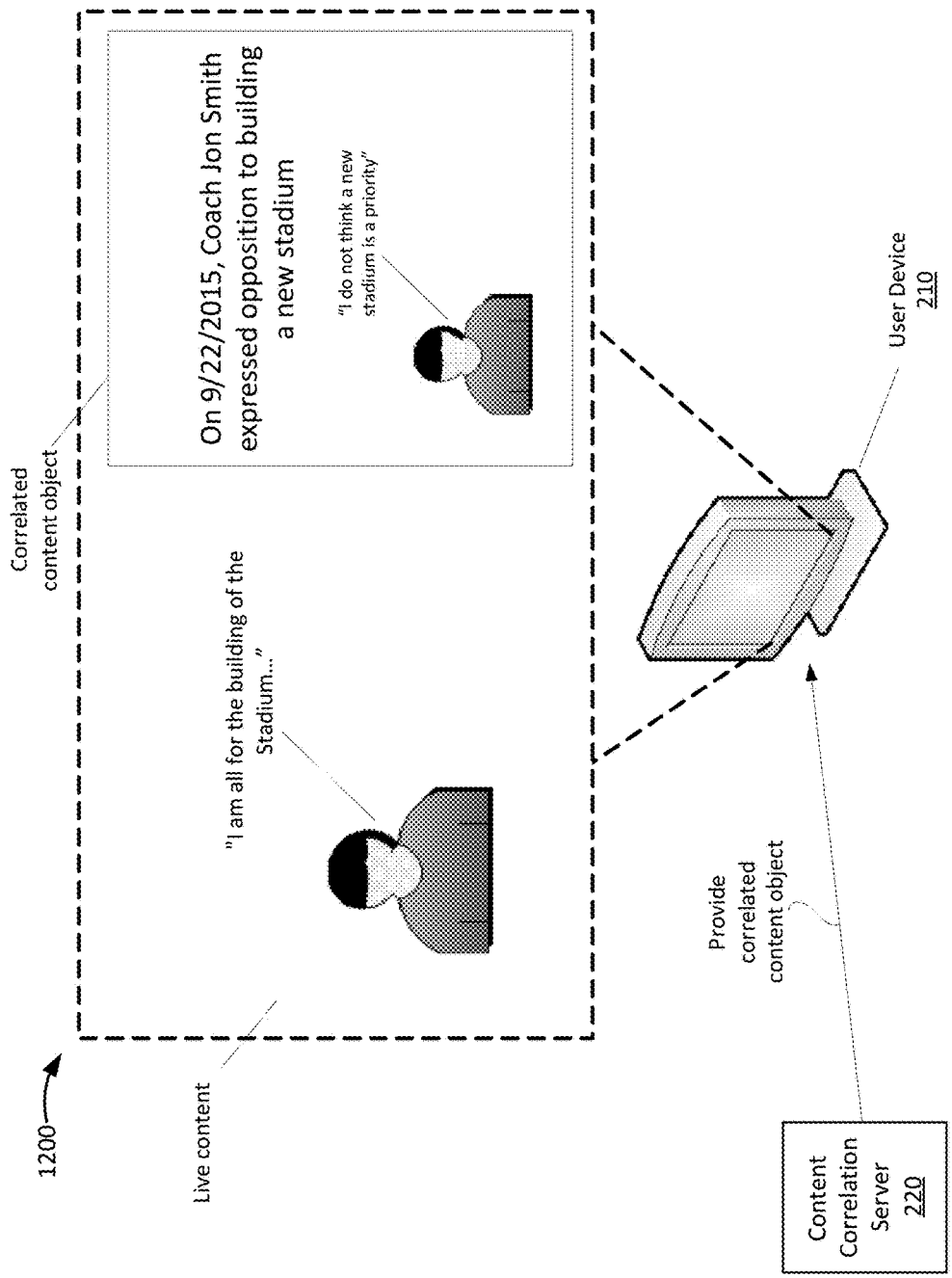
FIG. 12 shows an example implementation for presenting a correlated content object in accordance with aspects of the present invention.

FIG. 12 shows an example implementation for presenting a correlated content object as described herein. As shown in FIG. 12, the content correlation server 220 may provide a correlated content object to a user device 210. In the example of FIG. 12, the correlated content object may include a video embedded next to live content. For example, as shown in interface 1200, the live content may identify a speaker making a statement that favors the building of a stadium. In accordance with the processes described herein, the content correlation server 220 may extract metadata for the live content to identify a speaker and topic, lookup the same speaker and topic in a metadata repository, identify correlated content associated with the same speaker and topic (e.g., a video of the speaker previously discussing the same topic), and present the correlated content as an object that is embedded side-by-side with live content. Also, the correlated content may include a narrative describing what was previously stated by the individual. In this way, a comparison may be made of current statements and prior statements made by an individual regarding a particular topic.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computing device, a plurality of content objects from one or more computer content source devices;
    extracting, by the computing device, metadata from the plurality of content objects;
    storing, by the computing device, a plurality of records having the extracted metadata in a repository, wherein each record identifies a time in which a statement was made by an individual regarding a topic;
    identifying, by the computing device, correlated content between the plurality of content objects based on comparing the metadata in the records, wherein the correlated content includes a plurality of statements made by the individual regarding the topic at different periods of time;
    generating, by the computing device, a correlated content object having the correlated content; and
    providing, by the computing device, the correlated content object to a user device,
    wherein:
        the correlated content object includes a visual comparison of a plurality of statements made by the individual regarding the topic at different points in time, and
        the correlated content object emphasizes a contradictory statement in the plurality of statements.

2. The method of claim 1, wherein the plurality of content objects are selected form a group consisting of:
    live broadcasted content;
    audio content;
    video content;
    text content; and
    social media content.

3. The method of claim 1, wherein the extracting the metadata includes at least one selected from the group consisting of:
    identifying the metadata from predefined metadata included in the plurality of content objects;
    performing speech to text processing on the plurality of content objects;
    performing natural language processing on the plurality of content objects; and
    performing image analysis on the plurality of content objects.

4. The method of claim 3, wherein the extracting the metadata further includes identifying the individual and the statement made by the individual regarding the topic.

5. The method of claim 4, wherein the extracting the metadata further includes identifying a time index range in which the statement was made by the individual regarding the topic.

6. The method of claim 4, wherein the extracting the metadata further includes identifying a sentiment associated with the statement made regarding the topic.

7. The method of claim 6, further comprising receiving criteria for generating the correlated content object, wherein the identifying the correlated content includes identifying the records with metadata matching the criteria.

8. The method of claim 6, further comprising:
    receiving real-time content; and
    extracting metadata from the real-time content,
    wherein the identifying the correlated content includes identifying the records with metadata matching the extracted metadata from the real-time content.

9. The method of claim 1, wherein a service provider at least one of creates, maintains, deploys and supports the computing device.

10. The method of claim 1, wherein the receiving the plurality of content objects, the extracting the metadata, the storing the plurality of records, the identifying the correlated content, the generating the correlated content object, and the providing the correlated content object are provided by a service provider on a subscription, advertising, and/or fee basis.

11. The method of claim 1, wherein the computing device includes a storage device comprising software provided as a service in a cloud environment.

12. The method of claim 1, further comprising deploying a system for comparing statements made by the individual regarding the topic at different points in time, comprising providing a computer infrastructure operable to perform the receiving the plurality of content objects, the extracting the metadata, the storing the plurality of records, the identifying the correlated content, the generating the correlated content object, and the providing the correlated content object.

13. A computer program product for comparing statements made by an individual regarding a topic at different points in time the computer program product comprising a computer readable storage medium having program instructions embodied therewith, the program instructions executable by a computing device to cause the computing device to:
    receive a plurality of content objects from one or more computer content source devices;
    extract metadata from the plurality of content objects;
    store a plurality of records having the extracted metadata in a repository, wherein each record identifies a time in which a statement was made by an individual regarding a topic;
    receive real-time content;
    extract metadata from the real-time content;
    identify correlated content based on comparing the metadata in the records with the extracted metadata from the real-time content, wherein the correlated content includes a statement made by the individual regarding the topic at a prior time;
    generate a correlated content object having the correlated content; and provide the correlated content object to a user device, wherein:

the correlated content object includes a visual comparison of a plurality of statements made by the individual regarding the topic at different points in time, and the correlated content object emphasizes a contradictory statement in the plurality of statements.

14. The computer program product of claim 13, wherein the plurality of content objects are selected form a group consisting of:

live broadcasted content;
audio content;
video content;
text content; and
social media content.

15. The computer program product of claim 13, wherein the extracting the metadata from the plurality of content objects and from the real-time content includes at least one selected from the group consisting of:

identifying the metadata from predefined metadata included in the plurality of content objects;
performing speech to text processing on the plurality of content objects;
performing natural language processing on the plurality of content objects; and
performing image analysis on the plurality of content objects.

16. The computer program product of claim 15, wherein the extracting the metadata from the plurality of content objects and from the real-time content further includes identifying the individual and the statement made by the individual regarding the topic.

17. The computer program product of claim 16, wherein the extracting the metadata from the plurality of content objects and from the real-time content further includes identifying a sentiment associated with the statement made regarding the topic.

18. A system comprising:

a CPU, a computer readable memory and a computer readable storage medium associated with a computing device;
program instructions to receive a plurality of content objects from one or more computer content source devices;
program instructions to extract metadata from the plurality of content objects;
program instructions to store a plurality of records having the extracted metadata in a repository, wherein each record identifies a time in which a statement was made by an individual regarding a topic;
program instructions to receive content correlating criteria;
program instructions to identify correlated content based on comparing the metadata in the records with the content correlating criteria, wherein the correlated content includes a plurality of statements made by the individual regarding the topic at different points in time;
program instructions to generate a correlated content object having the correlated content; and
program instructions to provide the correlated content object to a user device, wherein:

the correlated content object includes a visual comparison of a plurality of statements made by the individual regarding the topic at different points in time, and the correlated content object emphasizes a contradictory statement in the plurality of statements wherein the program instructions are stored on the computer readable storage medium for execution by the CPU via the computer readable memory.

19. The system of claim 18, wherein the extracting the metadata includes at least one selected from the group consisting of:

identifying the metadata from predefined metadata included in the plurality of content objects;
performing speech to text processing on the plurality of content objects;
performing natural language processing on the plurality of content objects; and
performing image analysis on the plurality of content objects.

* * * * *